(12) United States Patent
Boyer

(10) Patent No.: US 7,083,032 B2
(45) Date of Patent: Aug. 1, 2006

(54) ELECTRONICALLY CONTROLLED FLUID COUPLING DEVICE

(75) Inventor: Rick L. Boyer, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 99 days.

(21) Appl. No.: 10/929,801

(22) Filed: Aug. 30, 2004

(65) Prior Publication Data

US 2006/0042902 A1    Mar. 2, 2006

(51) Int. Cl.
F16D 35/02    (2006.01)
F16K 31/06    (2006.01)

(52) U.S. Cl. .............. 192/58.61; 192/58.8; 251/129.11

(58) Field of Classification Search ............. 192/58.61, 192/58.8
See application file for complete search history.

(56) References Cited

U.S. PATENT DOCUMENTS

| | | | |
|---|---|---|---|
| 4,310,085 A | 1/1982 | LaFlame | |
| 4,893,703 A * | 1/1990 | Kennedy et al. ......... | 192/58.61 |
| 4,898,266 A | 2/1990 | Garrett et al. | |
| 4,898,267 A | 2/1990 | Garrett et al. | |
| 4,987,986 A | 1/1991 | Kennedy et al. | |
| 5,152,383 A * | 10/1992 | Boyer et al. ............. | 192/58.61 |
| 5,511,643 A | 4/1996 | Brown | |
| 5,584,371 A * | 12/1996 | Kelledes et al. ......... | 192/58.61 |
| 5,893,442 A * | 4/1999 | Light ...................... | 192/58.61 |
| 5,992,594 A | 11/1999 | Herrle et al. | |
| 6,021,747 A | 2/2000 | Gee et al. | |
| 6,056,098 A | 5/2000 | Brown et al. | |
| 6,561,141 B1 | 5/2003 | Stretch et al. | |
| 6,935,478 B1 * | 8/2005 | Drager et al. ............ | 192/58.61 |
| 2002/0096132 A1 | 7/2002 | Stretch et al. | |

* cited by examiner

Primary Examiner—Rodney H. Bonck
(74) Attorney, Agent, or Firm—Greg Dziegielewski, Esq.

(57) ABSTRACT

An electronically-controlled fluid coupling device having a front mounted fan and electrical actuation without a tethered harness. The fluid coupling device combines an inverted viscous clutch, drive pulley and a split electromagnetic actuator package. In this arrangement, the electrical portion of the split electromagnetic actuator is not physically attached to the fan drive, but is instead mounted to a stationary member. The remaining actuator components are integral to the fan drive and are composed of only mechanical parts. The inverted clutch arrangement having remote electronic control allows three output modes: engaged, partially engaged, or disengaged.

19 Claims, 2 Drawing Sheets

ELECTRONICALLY CONTROLLED FLUID COUPLING DEVICE

TECHNICAL FIELD

The invention relates generally to fan drive systems and more specifically to an electronically controlled fluid coupling device.

BACKGROUND ART

The present invention relates to fluid coupling devices of the type including both fluid operating chamber and a fluid reservoir chamber, and valving which controls the quantity of fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection therewith.

Fluid coupling devices ("fan drives") of the viscous shear type have been popular for many years for driving engine cooling fans, primarily because their use results in substantial saving of engine horsepower. The typical fluid coupling device operates in the engaged, relatively higher speed condition only when cooling is needed, and operates in a disengaged, relatively lower speed condition when little or no cooling is required. Today, electrically actuated viscous fan drives are commonplace because they can be precisely controlled between an engaged, partially engaged, and disengaged mode to control output at a given fan speed as determined by the vehicle's engine computer.

Today's electrically actuated viscous fan drives have the actuator mounted to either the front or the rear side of the fan drive. In both cases, the actuators are mounted to the drives through a ball bearing and the stationary electrical wires are then tethered to a stationary location on the engine or shroud or whatever optimum for the particular customer application. The length of tether for front mount actuators becomes a limiting factor for large fan applications and the axial length of the rear mount actuator limits the use from narrow package applications. Durability of either design is a function of bearing life and tether life. Ideally, a fan drive without a tether would be preferred if this improves durability and lowers cost while sustaining fan drive performance attributes.

The front mounted electrical actuator was result of an evolution of earlier air-actuated viscous fan drives used in heavy truck and large bus applications. The bi-metal control spring on the front of the viscous drive was simply replaced by a bearing mounted pneumatic solenoid. Durability issues with the tether and higher fuel economy requirements forced the heavy-duty industry to switch to pneumatic on-off friction clutches with no tether (air supply coming through the center of the mounting bracket-pulley subassembly). Today the heavy-duty industry is now facing even stiffer fuel economy and noise control requirements which has forced a need for variable speed or at least multi-speed fan drives. As a result, viscous drives are being considered again which has lead to the need for rear-actuated viscous fan drive. Subsequently, a rear mount electrical actuator was developed which has helped reduce potential tether durability problems associated with the front mount style actuator and in addition provides the customer an easier means to install the fan drive and associated tether.

Front actuated viscous fan drives continue to exist though for light to medium duty applications because the axial length and cost are better than rear actuated. However, in some light duty gas engine applications where the fan clutch is driven by the waterpump, a system resonance problem exists caused by numerous factors including mass and cg of the fan drive.

SUMMARY OF THE INVENTION

The present invention is intended to minimize the aforementioned problems with tethered actuators and system resonance while incorporating desirable features such as a high-speed reservoir and a combined "failsafe" and anti-drainback option.

The present invention enables a viscous fan drive with a front-mounted fan and electrical actuation without a tethered harness. The device of the present invention combines an inverted viscous clutch, a drive pulley and a split electromagnetic actuator resulting in a purely mechanical package that provides several advantages over existing engine-driven electronically managed viscous fan drives. An inverted clutch is one where the conventional clutch is essentially flipped around such that the central shaft is the output shaft while the finned members are the input.

In this configuration, the electrical portion of the actuator is not physically attached to the fan drive but rather is mounted to a stationary member of the drive pulley. The remaining actuator components are integral to the fan drive and as a result the fan drive itself has purely mechanical parts. The arrangement allows for fast response times to engage or disengage the clutch and also allows for open loop control of the electrical actuation.

Other features, benefits and advantages of the present invention will become apparent from the following description of the invention, when viewed in accordance with the attached drawings and appended claims.

BEST MODES(S) FOR CARRYING OUT THE INVENTION

Figure 1:
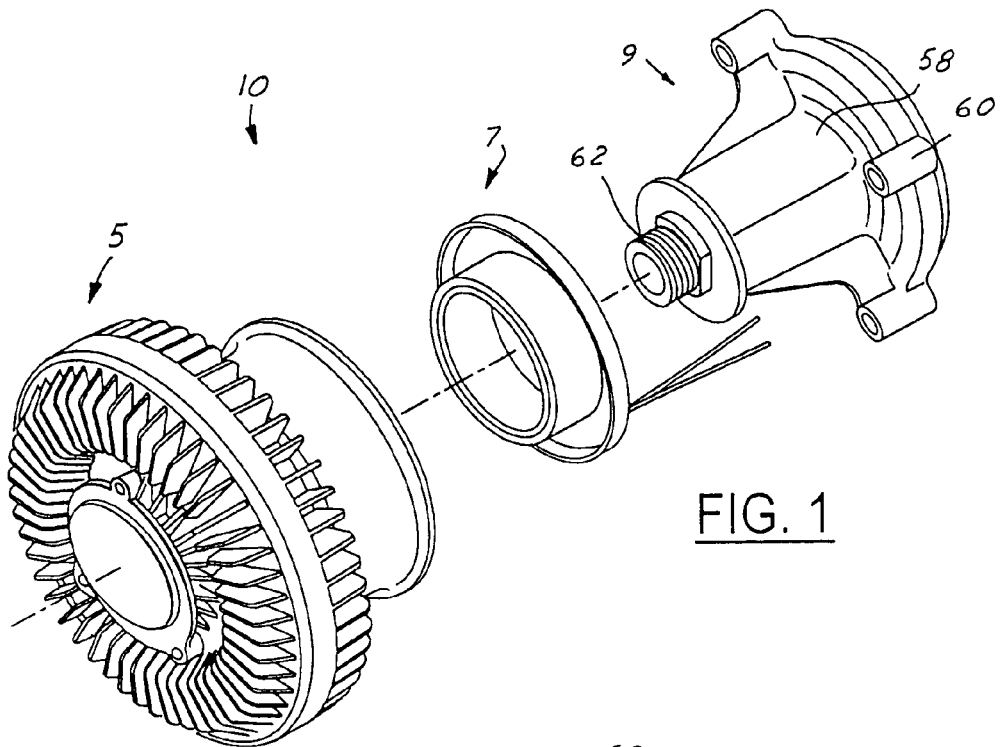
FIG. 1 an exploded perspective view of the major components of an electronically controlled fluid coupling device according to one preferred embodiment of the present invention.
Figure 2:
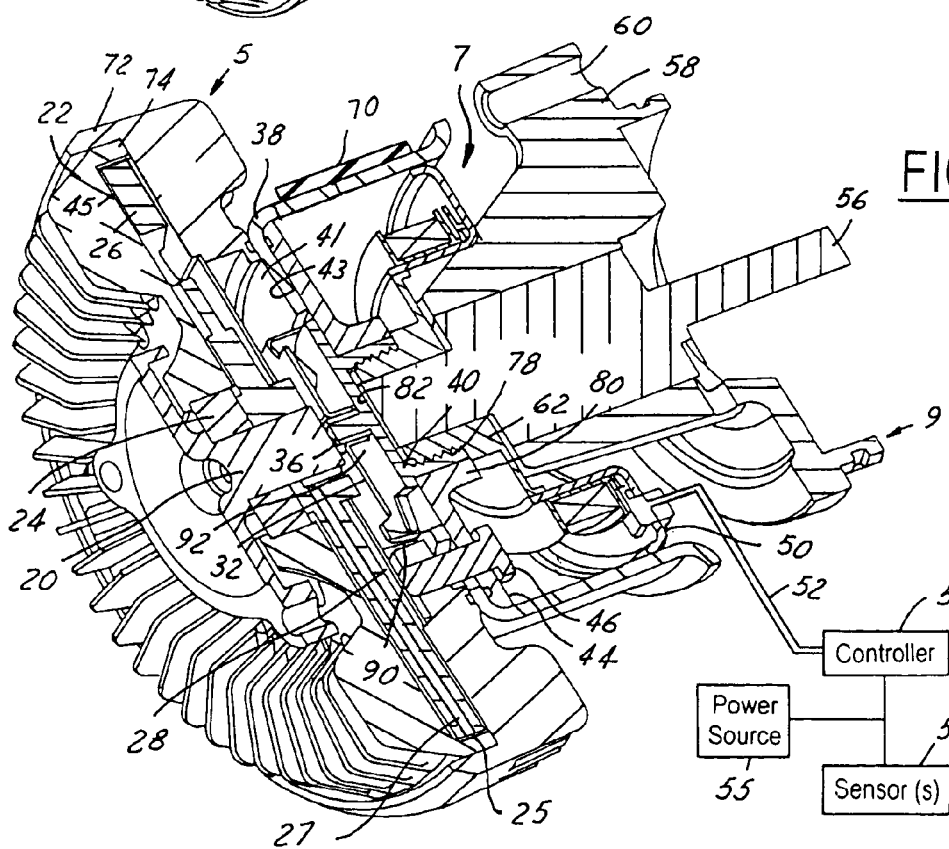
FIG. 2 is section view of an assembled electronically controlled fluid coupling device of FIG. 1.
Figure 3:
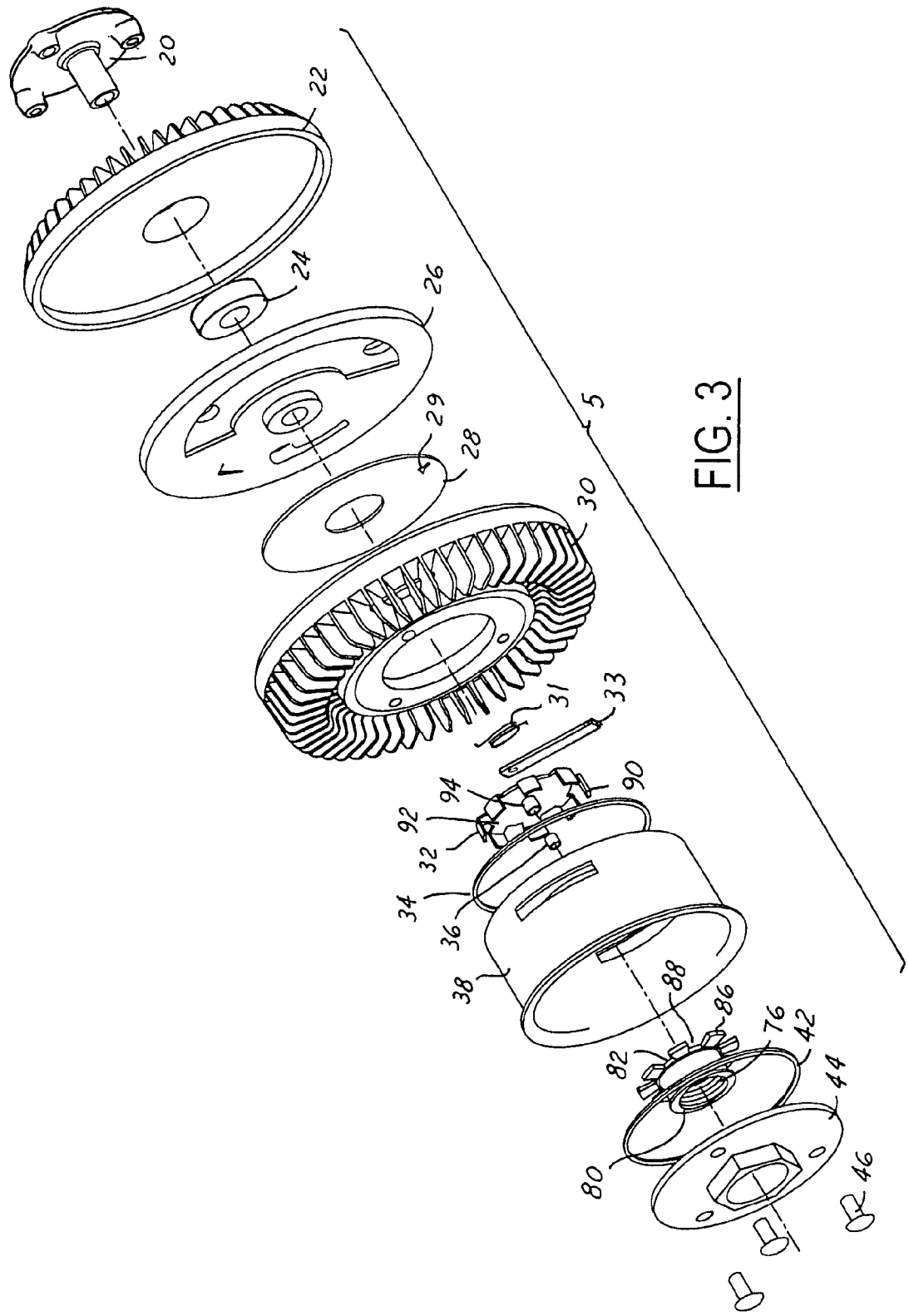
FIG. 3 an exploded perspective view of the electronically controlled fluid coupling device of FIG. 2.

Referring now to the drawings, which are not intended to limit the invention, FIGS. 1–3 illustrates one preferred form of a fluid coupling device 10 ("viscous fan drive") of a type utilizing the present invention. As best shown in FIG. 1, the fluid coupling device consists of three major subassemblies, including a fan drive subassembly 5, an electromagnet subassembly 7, and a waterpump subassembly 9. The waterpump subassembly 9, shown here as an engine-mounted waterpump subassembly 9 driven by a crankshaft pulley system, could also be a stand-alone bracket-pulley subassembly. As shown in FIG. 2, the electromagnet subassembly 7 is mounted to the stationary waterpump housing and the fan drive subassembly 5 mounts to the waterpump subassembly 9.

As best shown in FIGS. 2 and 3, the fan drive subassembly 5 includes an output shaft 20, a body 22, a ball bearing 24, a rotor 26, a reservoir plate 28 having a fill port 29, a cover 30, a torsion spring 31 an armature valve subassembly 32 having an attached valve arm 33, a gasket 34, a bushing 36, a pulley 38, a pole 40, a second gasket 42, a hub 44, and a plurality of rivets 46. The body 22 and cover 30 are preferably finned along their respective outer peripheries.

The electromagnetic subassembly 7 includes a coil 48 and steel housing 50 that is mounted to the stationary waterpump subassembly 9. The coil 48 has a wire harness 52 that is electrically coupled to a controller 54 and power source 55. The controller 54 receives electrical signals from a plurality of engine sensors 57 regarding engine and vehicle operating conditions. The controller 54 interprets these signals to direct the power source 55 to send electrical current to the coil 48 via the wire harness 52 to control the output from the fluid coupling device 10 in a manner described in more detail below. Other elements of the electromagnetic circuit contained with the fan drive subassembly 5 include the pole 40, the armature valve subassembly 32, the hub 44 and pulley 38. Further, the threaded steel adapter 62 on the waterpump subassembly 9 completes the electromagnetic circuit.

As shown in FIGS. 1 and 2, the waterpump subassembly 9 consists of a central rotatable waterpump shaft 56 bearing mounted within a stationary housing 58 which is mounted directly to the engine block face (not shown) near the crankshaft pulley (not shown) via mounting holes 60 using bolts (not shown). In an alternative preferred embodiment (not shown), the waterpump subassembly could be a stand-alone bracket-pulley subassembly. The waterpump shaft 56 is coupled to a plurality of impellers (not shown) used to control engine coolant flow within an engine cooling system to cool the engine. As best shown in FIG. 2, the pulley is coupled to the threaded steel adapter 62 of the waterpump shaft via the hub 44 and pole piece 40. Thus, the waterpump shaft 56 rotates at the same rotational rate as the pulley 38 to drive the impellers and therein provide coolant flow to the engine.

As best seen in FIG. 2, the steel engine-driven pulley 38 is sandwiched between the die-cast aluminum cover 30 and the non-ferrous hub 44 by way of rivets 46 or bolts (not shown) and sealed utilizing the first gasket 34 and second gasket 42. The pulley 38 is coupled to the engine crankshaft via a belt 70 and also provides an element of the electro-magnetic control circuit. The pulley 38 thus rotates the cover 30 at a rate determined by the engine operating speed translated to the pulley 38 via the crankshaft and belt 70.

The die-cast aluminum cover 30 has an overlying region 72 that is roll-formed around the outer periphery 74 of the die-cast aluminum body 22. Thus, the body 22 rotates at the same rotational rate as the cover 30. The output shaft 20 is rotatably mounted within the body 22 using a ball bearing 24 and is affixed to the rotor 26. The volume of space around rotor 26 and bounded by cover 30 and body 22 define a fluid chamber 43 having a quantity of viscous fluid (not shown), while the cover 30 and reservoir plate 28 define a fluid reservoir 41. Further, a fluid reservoir 41 is fluidically coupled with the fluid chamber 43 through fill port 29. The valve arm 33 covers or uncovers the fill port 29, depending upon the actuation of the electrical coil 48, to control the flow of fluid between the fluid reservoir 41 and fluid chamber 43. In addition, the fluid chamber 43 is fluidically coupled to a working chamber 45, defined between the rotor 26, body 22, and cover 30. The amount of viscous fluid contained in the working chamber 45, in conjunction with the rotational speed of the cover 30 coupled to the pulley 38, determines the torque transmitted to the rotor 26 that rotates the output shaft 20. In other words, the torque response is a result of viscous shear within the working chamber 45.

The rotor 26 also includes a scavenge chamber 27 that returns viscous fluid from the working chamber 45 to reservoir 41. Disposed adjacent the radially outer periphery of the operating chamber 45 is a pumping element 25, also referred to as a "wiper" element 25, operable to engage the relatively rotating fluid in the operating chamber 45, and generate a localized region of relatively higher fluid pressure. As a result, the pumping element 47 continually pumps a small quantity of fluid from the operating chamber 45 back into the reservoir chamber 41 through a scavenge chamber 27, in a manner well known in the art.

While not shown, the output shaft 20 may be coupled to a fan having a plurality of fan blades. Thus, the rotation of output shaft 20 may rotate the fan to cool the radiator or other engine components.

The pole 40 has a threaded inner portion 76 that is threaded onto the threaded steel adapter 62. The outer periphery 78 of the pole 40 is located between an outer projection 80 of the hub 44 and the threaded inner portion 76. The pole 40 also has a base region 82 that abuts the threaded steel adapter 62 of the waterpump shaft 56 and extends substantially perpendicularly with respect to the length of the threaded inner portion 76 and extends between the hub 44 and the reservoir plate 28 (is shown to the left of the threaded steel adapter 62 in FIG. 2). The pole 40 also has an inward center projection 84 that extends substantially perpendicular from the base region 82 and opposite the outer periphery 78. The pole 40 also has a plurality of pole pieces 86 separated by gaps 88 that extend around the outer periphery of the base region 82.

The valve arm armature subassembly 32 has a series of tooth-like projections 90, or leaf-like projections 90, that extend outward from a central region 92. The central region 92 has a central hole 94 containing the non-ferrous bushing 36 that is used to pilot the valve arm armature subassembly 32 around the inward center projection 84 of the pole 40. When assembled, the leaf-like projections 90 slightly overlap the respective pole pieces 40. A torsion spring 31 coupled to the assembly 32 maintains the projections 90 in a preset position wherein the leaf-like projections 90 are misaligned with the respective pole pieces 40. Upon magnetization, the projections 90 will attempt to line up with the pole pieces 40, therein rotating the subassembly 32 relative to the pole pieces 40.

The valve arm 33 is coupled to the central region 92 of the valve arm assembly 32 and extends towards the reservoir plate 28. The valve arm 33 is cantilevered at its free end. The valve arm 33 thus rotates with the subassembly 32 to cover or uncover the fill port 29. In an unmagnetized state (wherein no electrical current is flowing through the coil 48), the torsion spring 31 maintains the subassembly 32 such that the valve arm 33 is positioned wherein the fill port 29 is uncovered. This position is known as the "failsafe on" position, in that fluid flows from the fluid reservoir 41 to the fluid chamber 43 through the fill port 29 is maintained in the absence of electrical current flowing to the coil 48, which maintains the rotor and output member in an engaged position to provide cooling airflow even in the absence of electrical actuation to prevent overheating of the attached engine.

The amount of electrical power supplied in terms of pulse width modulation from the external controller 54 and power source 55, and hence the amount of magnetic flux available to control the relative positioning of the valve arm 33, is determined by the external controller 54. The controller 54 receives a set of electrical inputs from various engine sensors 57 that monitor various engine operating conditions relating to engine temperature, fuel economy, emissions or other engine operating conditions affecting the performance of the engine. For example, one of the sensors 57 could be an engine mounted coolant sensor or a pressure sensor mounted to the air conditioner. The controller 54 has a stored look up table that determines a desired engine operating range for a given engine speed. When the controller 54 determines that one or more of these sensors 57 are sensing cooling conditions outside the desired operating range, the external controller 54 will direct the power source 55 to send electrical power to the coil 48 as a function of this electrical signal. Thus, for example, if the external controller 54 determines that the engine coolant temperature is too low, or that the engine temperature is too low, a signal may be sent from the controller 54 to the power source 55 to activate the coil 48 to a desired pulse width, therein providing a magnetic field within the fluid coupling device 10. Upon magnetization, the projections 90 will attempt to line up with the pole piece 40, therein rotating the subassembly 32 relative to the pole piece 40. The rotation of the subassembly 32 therein causes the coupled valve arm 33 to rotate and cover the fill hole 29, therein preventing viscous fluid flow to the working chamber 45. The reduction of viscous fluid within the working chamber 45 minimizes shearing of the viscous fluid within the working chamber 45 to drive the rotor 26 and output member 20. Hence, a fan coupled to the output member 20 would rotate slower in this condition to bring cooling conditions within a desired range.

Similarly, if the external controller 54 determines from one or more of the sensors 57 that the engine, or engine coolant temperature, is above an undesired high range, no signal is sent from the external controller 54 to the power source 55 and coil 48. The valve arm 33 is thus maintained in a position wherein the fill port 29 is uncovered, therein allowing maximum fluid flow from the fluid reservoir 41 to the fluid chamber 43 and to the working chamber 45. This provides maximum torque response of the rotor 26 to rotate the output shaft 20. This in turn rotates the fan and fan blades to provide maximum cooling to the radiator to cool the engine coolant.

The present invention provides numerous advantages over currently available front and rear actuated viscous fan drives. For example, the electrical portion of the actuator is not physically attached to the fan drive, but rather is mounted to a stationary member of the drive pulley. As such, there is no tethered wire harness and no actuator bearing. This leads to easier and less costly manufacturing, as there are no wires or connectors. Further, the coil is easily replaced, which lowers service and warranty costs.

Further, the remaining actuator components are integral with the engine side of the fan drive. This leads to lower overhanging mass on the drive components, which leads to higher system resonant frequency and possible improvements in waterpump durability. This also leads to compact packaging, which can improve vehicle costs.

While the invention has been described in connection with one embodiment, it will be understood that the invention is not limited to that embodiment. On the contrary, the invention covers all alternatives, modifications, and equivalents as may be included within the spirit and scope of the appended claims.

For example, an accumulator plate could also be used in conjunction with the reservoir plate to enable a failsafe valve arm feature yet allow an anti-drainback feature. An example of the use of an accumulator plate in conjunction with a fluid reservoir is described in U.S. application Ser. No. 10/287,325 to May et al., entitled "Electronically Controlled Viscous Fan Drive", which is herein incorporated by reference.

Further, in another alternative embodiment, the valve arm 33 could be coupled to the valve arm subassembly 32 such that it covers the fill port 29 in the absence of electrical activation of the coil 48. Thus, the clutching mechanism is engaged when current is applied from power source 55 ("non-failsafe mode").

Finally, in another preferred embodiment, the amount of pulse width modulation to said electrical coil could be such to generate a magnetic field in which the valve arm partially covers the fill port 29. The magnetic field generated would be less than the magnetic field necessary to rotate the subassembly 32 completely to the second position covering the fill port 29. This third position would allow partial engagement of said rotor 26 and output at an infinite number of midlevel outputs to more precisely control the amount of cooling available to the radiator.

What is claimed is:

1. An electronically controlled fluid coupling device comprising:

an output member including a center shaft;

an input member bearing mounted around said output member, said input member comprising a body and a cover;

a stationary waterpump housing assembly bearing mounted to said input member;

a rotor mounted to said output member and contained within said cover and said body, said body and said rotor defining a working chamber;

a reservoir plate mounted to said input member, said reservoir plate having a fill port:

a fluid reservoir defined between said reservoir plate and said cover, said fluid reservoir having a quantity of viscous fluid;

a fluid chamber defined between said reservoir plate and said rotor, said fluid chamber fluidically coupled to said working chamber and fluidically coupled to said fluid reservoir through said fill port;

a rotatable armature subassembly coupled to said input member, said rotatable armature subassembly rotatable to any of an infinite number of positions between a first position, a midlevel position, and a second position;

a valve arm fixedly coupled to said rotatable armature subassembly, said valve arm capable of covering said fill port when said rotatable armature subassembly is in said second position, therein preventing flow of said quantity of viscous fluid from said fluid reservoir to said fluid chamber, said valve arm capable of partially covering said fill port when said rotatable armature is in said midlevel position, therein allowing partial flow of said quantity of viscous fluid from said fluid reservoir to said working chamber to partially engage said rotor and said output member;

an electromagnetic subassembly mounted to said stationary waterpump housing;

a power source electrically coupled to said electromagnetic subassembly;

a controller electrically coupled to said power source, said controller directing said power source to provide an electrical current to said electromagnetic subassembly, wherein said electromagnetic subassembly induces a magnetic field in response to said electrical current, wherein said armature valve subassembly rotates from said first position to said midlevel position to said second position depending upon a strength of said magnetic field.

2. The fluid coupling device of claim 1 further comprising a torsion spring, said torsion spring maintaining said rotatable armature subassembly in said first position in the absence of said magnetic field.

3. The fluid coupling device of claim 1 further comprising a pole coupled to input member, said pole having a plurality of pole pieces extending outwardly from a base region.

4. The fluid coupling device of claim 3, wherein said rotatable armature subassembly comprises a plurality of tooth-like projections extending form a central region, wherein one of said plurality of tooth-like projections aligns with a corresponding one of said plurality of pole pieces in response to said magnetic field.

5. The fluid coupling device of claim 1, wherein said input member further comprises a belt driven pulley coupled to a non-ferrous hub.

6. The fluid coupling device of claim 1, wherein said input member further comprises a waterpump shaft, said waterpump shaft coupled to said center shaft and bearing mounted within said stationary waterpump shaft housing.

7. The fluid coupling device of claim 1 further comprising at least one sensor electrically coupled to said controller, said at least one sensor sending an electrical signal to said controller as a function of a desired engine operating condition.

8. An electronically controlled fluid coupling device comprising:
   an output member including a center shaft;
   an input member bearing mounted around said output member, said input member comprising a body and a cover;
   a stationary waterpump housing assembly bearing mounted to said input member;
   a rotor mounted to said output member and contained within said cover and said body, said body and said rotor defining a working chamber;
   a reservoir plate mounted around said output member and coupled between said cover and said rotor, said reservoir plate having a fill port;
   a fluid reservoir defined between said reservoir plate and said cover, said fluid reservoir having a quantity of viscous fluid;
   a fluid chamber defined between said reservoir plate and said rotor, said fluid chamber fluidically coupled to said working chamber and fluidically coupled to said fluid reservoir through said fill port;
   a rotatable armature subassembly coupled to said input member, said rotatable armature subassembly rotatable to any of an infinite number of positions between a first position, a midlevel position, and a second position;
   a valve arm fixedly coupled to said rotatable armature subassembly, said valve arm capable of uncovering said fill port when said rotatable armature subassembly is in said second position, therein allowing flow of said quantity of viscous fluid from said fluid reservoir to said fluid chamber, said valve arm capable of partially covering said fill port when said rotatable armature is in said midlevel position, therein allowing partial flow of said quantity of viscous fluid from said fluid reservoir to said working chamber to partially engage said rotor and said output member;
   an electromagnetic subassembly mounted to said stationary waterpump housing;
   a power source electrically coupled to said electromagnetic subassembly;
   a controller electrically coupled to said power source, said controller directing said power source to provide electrical current to said electromagnetic subassembly, wherein said electromagnetic subassembly induces a magnetic field in response to said electrical current, wherein said armature valve subassembly rotates from said first position to said midlevel position to said second position in response depending upon a strength of said magnetic field.

9. The fluid coupling device of claim 8 further comprising a torsion spring, said torsion spring maintaining said rotatable armature subassembly in said first position in the absence of said magnetic field.

10. The fluid coupling device of claim 8 further comprising a pole coupled to input member, said pole having a plurality of pole pieces extending outwardly from a base region.

11. The fluid coupling device of claim 10, wherein said rotatable armature subassembly comprises a plurality of tooth-like projections extending form a central region, wherein one of said plurality of tooth-like projections aligns with a corresponding one of said plurality of pole pieces in response to said magnetic field.

12. The fluid coupling device of claim 8, wherein said input member further comprises a belt driven pulley coupled to a non-ferrous hub.

13. The fluid coupling device of claim 8 further comprising at least one sensor electrically coupled to said controller, said at least one sensor sending an electrical signal to said controller as a function of a desired engine operating condition.

14. A method for controlling the engagement of an electronically controlled fluid coupling device, the method comprising:
   (a) forming the electronically controlled fluid coupling device comprising:
   an output member including a center shaft;
   an input member bearing mounted around said output member said input member comprising a body and a cover;
   a stationary waterpump housing assembly bearing mounted to said input member;
   a rotor mounted to said output member and contained within said cover and said body, said body and said rotor defining a working chamber;
   a reservoir plate mounted around said output member and coupled between said cover and said rotor, said reservoir plate having a fill port;
   a fluid reservoir defined between said reservoir plate and said cover, said fluid reservoir having a quantity of viscous fluid;
   a fluid chamber defined between said reservoir plate and said rotor, said fluid chamber fluidically coupled to said working chamber and fluidically coupled to said fluid reservoir through said fill port;
   a rotatable armature subassembly coupled to said input member, said rotatable armature subassembly rotatable between a first position and a second position;
   a valve arm fixedly coupled to said rotatable armature subassembly, said valve arm uncovering said fill port when said rotatable armature subassembly is in said first position and covering said fill port when said rotatable armature subassembly is in said second position and partially covering said fill port in a midlevel position;

an electromagnetic subassembly mounted to said stationary waterpump housing, said electromagnetic subassembly including a coil;
a power source electrically coupled to said coil;
a controller electrically coupled to said power source; and
at least one sensor electrically coupled to said controller;
(b) measuring an engine operating condition using said at least one sensor at a given engine speed, said given engine speed corresponding to a rotational speed of said input member;
(c) comparing said measured engine operating condition with a desired engine operating condition range at said given engine speed;
(d) generating an electrical current within said power source when said measured engine operating condition is not within said desired engine operating condition range, wherein the generation of said electrical current activates said coil, therein generating a magnetic field, wherein said magnetic field causes said rotatable armature subassembly to rotate in response to the strength of said magnetic field from said first position to either said midlevel position or said second position to control the flow of viscous fluid from said fluid reservoir to said working chamber through said fill port to control the rotational rate of said output member.

15. The method of claim 14, wherein (c) comparing said measured engine operating condition with a desired engine operating condition range at said given engine speed comprises:
determining a desired engine operating condition range at said given engine speed from a look-up table or an algorithm contained within said controller;
comparing said measured engine operating condition to said desired engine operating condition range; and
sending a electrical signal from said controller to said power source when said measured engine operating condition is not within said desired engine operating condition range.

16. The method of claim 15, wherein (d) generating an electrical current comprises generating a pulse width modulation signal within said coil as a function of said electrical signal received from said controller, wherein said pulse width modulation signal creates a magnetic field, wherein said armature valve subassembly rotates in response to magnetic field from said first position to said second position, wherein said first position is defined wherein said valve arm uncovers said fill port and said second position is defined wherein said valve arm covers said fill port.

17. The method of claim 15, wherein (d) generating an electrical current comprises generating a pulse width modulation signal within said coil as a function of said electrical signal received from said controller, wherein said pulse width modulation signal creates a magnetic field, wherein said armature valve subassembly rotates in response to magnetic field from said second position to said first position, wherein said first position is defined wherein said valve arm uncovers said fill port and said second position is defined wherein said valve arm covers said fill port.

18. The method of claim 15, wherein (d) generating an electrical current comprises generating a pulse width modulation signal within said coil as a function of said electrical signal received from said controller, wherein said pulse width modulation signal creates a magnetic field, wherein said armature valve subassembly rotates in response to magnetic field from said first position to said midlevel position, wherein said first position is defined wherein said valve arm uncovers said fill port and said midlevel position is defined wherein said valve arm partially covers said fill port.

19. The method of claim 15, wherein (d) generating an electrical current comprises generating a pulse width modulation signal within said coil as a function of said electrical signal received from said controller, wherein said pulse width modulation signal creates a magnetic field, wherein said armature valve subassembly rotates in response to magnetic field from said second position to said midlevel position, wherein said first position is defined wherein said valve arm uncovers said fill port and said midlevel position is defined wherein said valve arm partially covers said fill port.

* * * * *